Dec. 15, 1959  H. L. RISDON  2,917,221
MULTI-PURPOSE CONTAINER
Filed Jan. 31, 1957  3 Sheets-Sheet 1
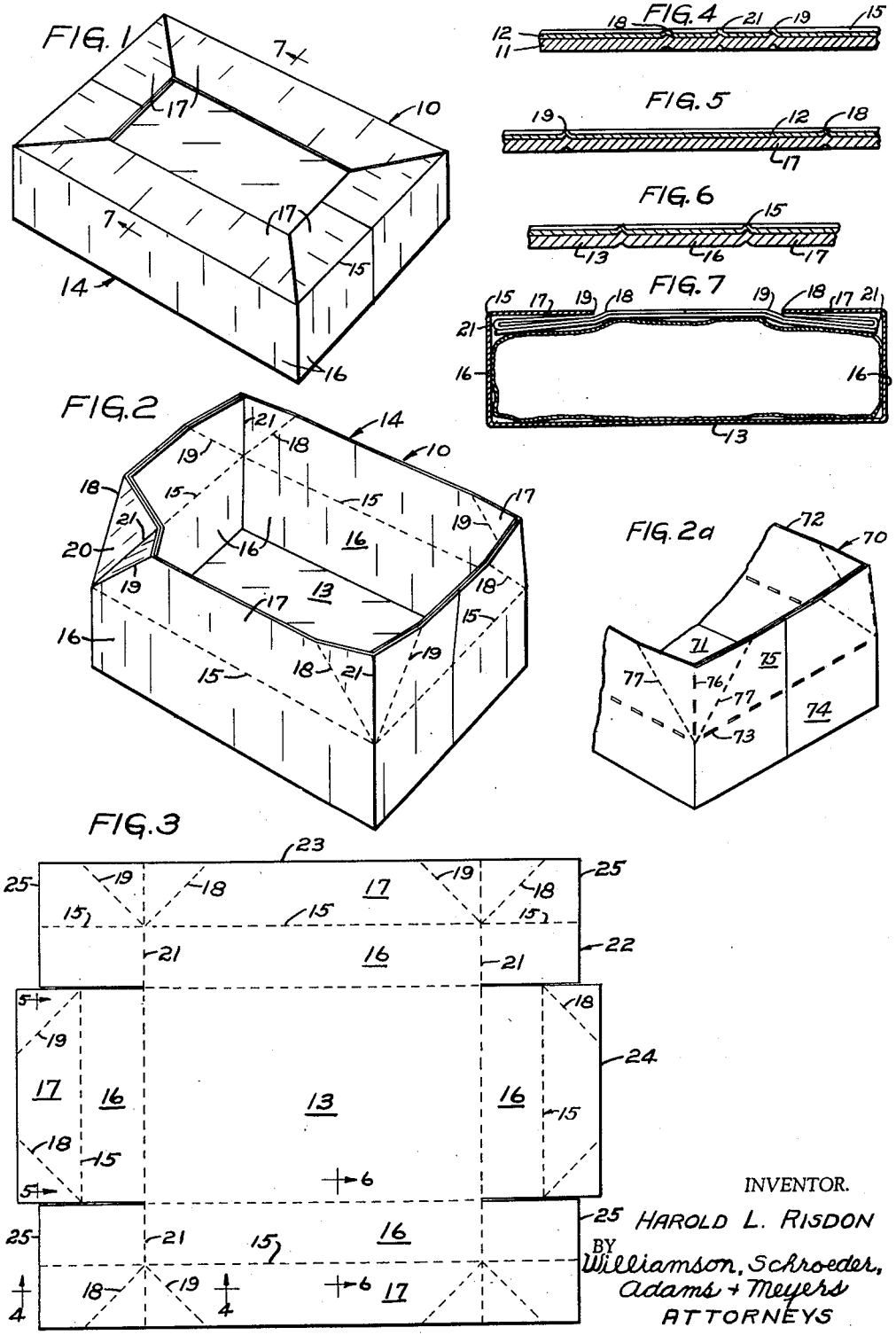
INVENTOR.
HAROLD L. RISDON
BY
Williamson, Schroeder,
Adams + Meyers
ATTORNEYS Dec. 15, 1959          H. L. RISDON          2,917,221
MULTI-PURPOSE CONTAINER
Filed Jan. 31, 1957          3 Sheets-Sheet 2
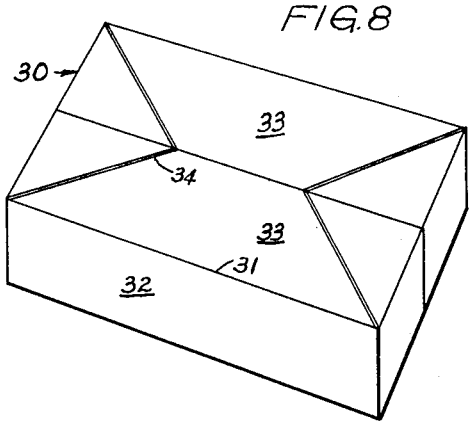
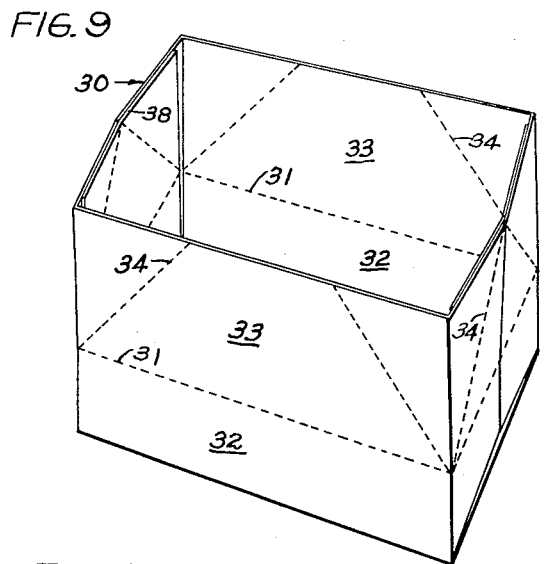
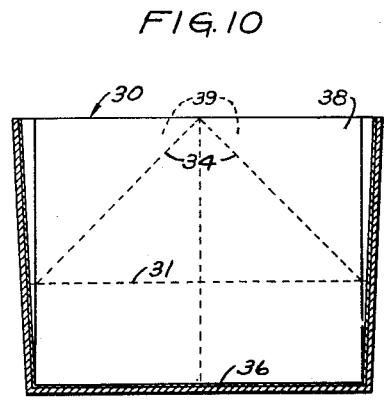
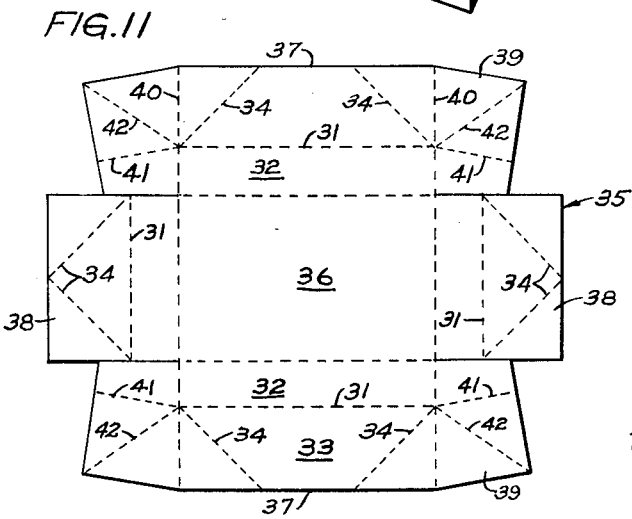
INVENTOR.
HAROLD L. RISDON
BY Williamson, Schroeder,
Adams + Meyers
ATTORNEYS Dec. 15, 1959  H. L. RISDON  2,917,221
MULTI-PURPOSE CONTAINER Filed Jan. 31, 1957  3 Sheets-Sheet 3

INVENTOR.
HAROLD L. RISDON
BY Williamson, Schroeder,
Adams + Meyers
ATTORNEYS

United States Patent Office 2,917,221
Patented Dec. 15, 1959

2,917,221

MULTI-PURPOSE CONTAINER

Harold L. Risdon, Minneapolis, Minn., assignor to The Pillsbury Company, a corporation of Delaware Application January 31, 1957, Serial No. 637,524

12 Claims. (Cl. 229—34)

This invention relates to containers and more particularly relates to multi-purpose containers of the type for holding food stuffs and the like.

In recent years there has been substantial public demand for dry ingredient mixtures for producing cakes and the like. The use of such mixes has materially reduced the time and effort involved in producing cakes as compared to procedures commonly used prior to the advent of such mixes. However, even with the use of such mixes, it has been necessary to employ, in addition to the box in which the mix is sold, a mixing bowl in which the cake batter is produced from dry ingredients and liquid, and a cake pan. After the batter is prepared and put in the oven to bake, additional time and effort is expended in cleaning up the mixing bowl and the scraper which is conventionally employed for wiping the batter from the bowl.

An object of my invention is to provide a new and improved multi-purpose container of simple and inexpensive construction and operation.

Another object of my invention is the provision of a novel container which may be readily and easily adapted for a plurality of successive uses in the storage and preparation of food products for consumption.

A further object of my invention is to provide an improved receptacle which is constructed to facilitate successive storing therein of ingredients for production of a cake or the like, mixing therein of such ingredients with other ingredients for the production of a batter, and cooking therein of the batter into a finished food product.

A further object of my invention is the provision of a receptacle adapted for storage in small compass with other similar receptacles, and also adapted for successive multiple usages in storing of ingredients, mixing of such ingredients with other ingredients into a batter and cooking of the batter into a finished product.

These and other objects and advantages of my invention will more fully appear from the following description made in connection with the accompanying drawings wherein like reference characters refer to the same parts throughout the several views and in which:

Fig. 1 is a perspective view of the container in closed position;

Fig. 2 is a perspective view of the container in open position;

Fig. 2a is a detail perspective view similar to Fig. 2, of a modified form of the container;

Fig. 3 is a plan view of a blank for forming the container shown in Figs. 1 and 2;

Figs. 4, 5 and 6 are enlarged detail section views taken substantially at 4—4, 5—5 and 6—6 respectively in Fig. 3;

Fig. 7 is a transverse section view of the container in closed condition and taken on a substantially vertical plane as indicated at 7—7 in Fig. 1;

Fig. 8 is a perspective view of a modified form of the container in closed condition;

Fig. 9 is a perspective view of the container shown in Fig. 8 and disposed in open condition;

Fig. 10 is a transverse section view of the open container shown in Fig. 9;

Fig. 11 is a plan view of a blank for forming the container shown in Figs. 8 and 9;

Figure 12:
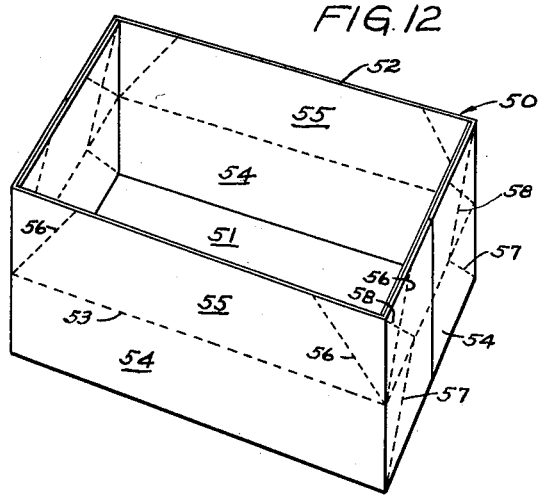
Fig. 12 is a perspective view of another modified form of the invention.

The invention comprises a multi-purpose container or carton which is closable to store and retain food products such as cake mixes and the like, and which is openable to provide a circumferentially continuous upright extension for the carton sidewalls to facilitate mixing of liquids and the like into the cake mix to form a batter and to subsequently permit the cooking or baking of the cake without removing the batter from the container. To this end the container or carton which is indicated in general by numeral 10 is constructed of stiff, but bendable sheet material which is resistent to moisture penetration and is also resistent to deterioration due to heat, at least within the range of temperatures necessary to cook the food product, or more specifically within the range of oven temperatures necessary to bake a cake. In the form shown, in Figs. 1–7, the carton 10 is constructed of heavy paper or kraft board material which has a lamination of foil 12 applied on the inner surface thereof to prevent moisture penetration of the kraft board 11. The board material 11 is relatively stiff, but may be bent and will bend or fold along predetermined lines if the board material is scored at the fold lines.

The carton 10 has a bottom 13 and a multi-sided wall structure indicated in general by numeral 14 which is integral with the bottom 13 and is continuous around the carton periphery. The wall structure 14 has a circumferentially extending score line 15 intermediate the upper and lower edges thereof to define wall panels 16 therebelow and flap panels 17 thereabove in each of the sides of the wall structure. The wall panels 16 are constructed with sufficient height as to facilitate confining of the food products within the container when the flap panels 17 are folded inwardly into horizontal position substantially as shown in Fig. 1. It will be noted in Fig. 2 that the flap panels 17 are interconnected with each other at the corners of the wall structure 14 and are adapted to be disposed in an upright position on the wall panels 16.

Means are provided in the flap panels 17 to facilitate folding of the flap panels downwardly and inwardly into substantially horizontal position for at least partially enclosing the storage area of the carton, and for also facilitating retaining of the flap panels in upright position. In the form shown, such means include a pair of diagonal score lines 18 and 19 in the opposite ends of each of the flap panels 17 and adjacent the corners of the wall structure. The score lines 18 and 19 converge and intersect with the circumferential score line 15 at the corners or the ends of the flap panels 17. Inward folding of each of the flap panels back upon itself is thereby facilitated along the diagonal score lines 18 and 19, substantially in the manner shown at the corner portion 20 in Fig. 2. It will be noted that as the flap panels 17 are folded inwardly back upon themselves at the score lines 18 and 19, the adjacent flap panels are folded outwardly back upon each other at the corner score lines 21 of the wall structure. When each of the corner portions of the wall structure have been folded inwardly in the manner of corner portion 20, the flap panels 17 may be folded inwardly to the position shown in Fig. 1. It will be noted that at each corner portion, the angles between the diagonal score line 18 and the circumferential score line 15 and between the diagonal score line 19 and the circumferential score line 15 are complementary with respect to each other. In the form shown, these angles are both forty-five degrees because of the right angle relation between adjacent sides in the wall structure 14.

As best seen in Fig. 7, the end portions of the flap panels 17 protrude downwardly and inwardly of the carton storage area when the flap panels 17 are folded into closed position. The inwardly protruding end portions of the flap panels will normally be swung upwardly to lie against the flap panels to facilitate full use of the storage area of the carton.

The blank for forming the carton 10 is shown in Fig. 3 and is indicated in general by numeral 22. The several score lines 15, 18, 19 and 21, hereinbefore mentioned are impressed into the blank 22 substantially as shown. The blank 22 has the bottom panel 13 and a plurality of side and end panels 23 and 24 to form the multi-sided wall structure of the carton. The side panels 23 have securing tabs 25 on the opposite ends thereof for wrapping around the end panels in overlying relation to be secured thereto as by gluing when the carton is formed. The securing tabs 25 have the score line 15 therein to define wall and flap panel portions thereabove and therebelow, and have diagonal score lines 18 and 19 which converge and intersect with the score line 15 at the corner score lines 21. When the carton is formed from the blank 22, the diagonal score lines 18 and 19 of the securing tabs 25 overlie the corresponding score lines 18 and 19 in the adjacent end flaps 24.

A package or bag of cake mix or the like may be stored in the carton in closed condition. The carton 10 may be confined within a retaining sleeve so as to maintain the flap panels 17 in inwardly folded condition.

When the cake is to be prepared the flap panels 17 will be swung upwardly substantially into the position shown in Fig. 2. The end portions of the flap panels are swung outwardly from the position of corner portion 20 to the position of the other corner portions, and as the corner portions are swung in this manner, they move through an "over-center" position so that the ends of the flap panels, working against each other through the fold lines 21, and urge each other outwardly and hold the flap panels in the upright position. Because the carton is constructed of a liquid-resisting material, the dry ingredients of the cake mix may be placed directly in the carton 10 and liquid may be added thereto to form a cake batter when mixed together. The mixing may be accomplished in the open carton 10. When the mixing of the batter is completed, the open carton 10 with the batter therein may be inserted into an oven for baking the cake batter and producing a finished product.

Depending, of course, upon the type of cake being made, the cake may rise substantially during the baking process. The batter in the carton 10 may fill the lower portion of the carton up to the score line 15 and when the cake is baked, the flap panels 17 will retain the rising cake within the confines of the carton.

The form of the invention shown in the Figs. 8–11 is substantially the same as that shown in Figs. 1–7. The carton is constructed of a similar material and has an integral bottom and multi-sided wall structure indicated in general by numeral 30 which has a score line 31 defining a plurality of wall panels 32 and flap panels 33. The opposite sides of the wall structure are inclined upwardly and outwardly so as to facilitate ready and easy nesting of a plurality of cartons for ready and easy storage and shipment thereof in small compass.

The flap panels 33 are provided with diagonal score lines 34 which converge and intersect with the score lines 31 at the corners of the wall structure. The angles between the score lines 34 and the score lines 31 in the adjacent flap panels at one corner portion of the carton are complementary with respect to each other.

It should be noted that in this form of the invention the flap panels are substantially higher or wider than those shown in Figs. 1 and 2 and the flap panels 33 thereby are adapted to engage each other in edge-to-edge relation when folded inwardly as seen in Fig. 8.

The carton-forming blank shown in Fig. 11 is substantially similar to that shown in Fig. 3, but is adapted to form the carton having the upwardly divergent opposite side walls to facilitate nesting of similar cartons. The blank which is indicated in general by numeral 35 has a bottom panel 36, a pair of opposite side panels 37 and a pair of opposite end panels 38. The side and end panels have the score line 31 impressed therein. The side and end panels 37 and 38 have the diagonal score lines 34 impressed therein. The side panels 37 are provided with securing tabs 39 at the opposite ends thereof and adapted to fold with respect to the side panels at the score lines 40 therebetween. A score line 41 is arranged in the tabs 39 in end-to-end relation with the score line 31 in the side panels 37 but the score line 41 is disposed slightly obliquely with respect to score line 31. The tabs 39 are also provided with score lines 42 which are disposed diagonally and in convergent intersection with the score lines 41 at the corner score lines 40. The angle between the score lines 41 and 42 is identical to the angle between the score lines 34 and 31 of the end panels so that these score lines 41 and 42 overlie the score lines 34 and 31 of the end panels and permit the side panels 37 to be inclined upwardly and outwardly when the carton is assembled.

The operation of this form of the container is substantially identical to that shown in Figs. 1 and 2 with exception that this form of carton may be nested one inside the other for storage.

The form of the invention shown in Figs. 12–15 is substantially identical to that shown in Figs. 1–7. This form of the invention is also constructed of a moisture and heat resistant material, and it is specifically noted here that the sheet material from which the carton is formed need not necessarily be laminated with a foil lining material. The sheet material forming the carton may be coated with any suitable substance providing resistance to moisture penetration and to deterioration due to heat. It is also desirable that the material from which the carton is formed be smooth and of such a nature that a cake when baked therein will be prevented from sticking to the carton sidewalls and bottom. The carton shown in Figs. 12–15 is indicated in general by numeral 50 and includes an integral bottom 51 and a multi-sided wall structure 52 which has a circumferentially extending score line 53 defining wall panels 54 therebelow and flap panels 55 thereabove. The flap panels 55 have diagonal score lines 56 at the opposite ends thereof converging and intersecting with the score line 53 at the corners of the wall structure to facilitate inward swinging of the flap panels 55 into carton-closing position. Means are also provided in the wall structure to facilitate folding of the carton 50 into small compass for ready and easy storage and shipping. To this end, a pair of opposed wall panels 54 have score lines 57 at the opposite ends thereof converging and intersecting with the bottom edge of the wall panels at the corners of the wall structure 52. The flap panels at the corresponding sides of the wall structure are also provided with score lines 58 extending diagonally thereacross and disposed in end-to-end relation with the score lines 57 in the wall panels 54. In the form shown the score lines 58 in the flap panels are disposed obliquely of the score lines 57 and the score lines 58 converge and intersect with the upper edges of the flap panels at the corners of the wall structure.

Figure 13:
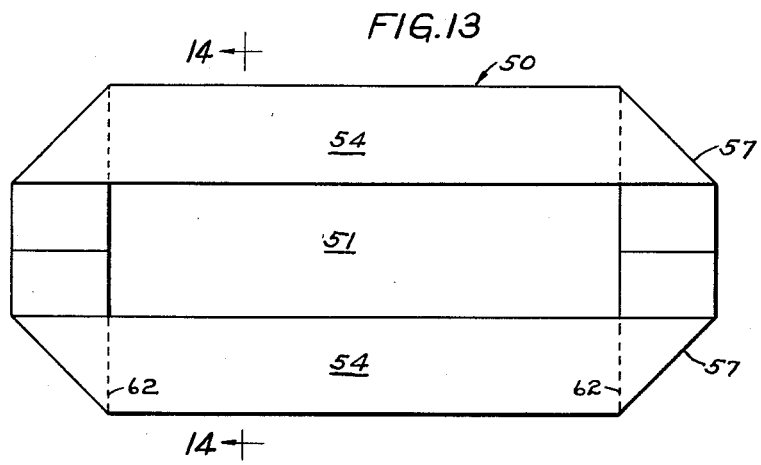
Fig. 13 is a top plan view of the container shown in Fig. 12 and showing the container in flattened condition to facilitate ready and easy storage and shipping thereof.
Figure 14:
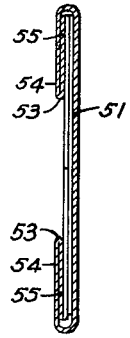
Fig. 14 is a transverse section view of the flattened container shown in Fig. 13 and being taken substantially at 14—14.

In this form of the invention the carton 50 is normally folded flat and into small compass substantially to the position shown in Figs. 13 and 14. The flap panels 55 are folded inwardly at their opposite ends and the flap panels are folded inwardly and downwardly on the score lines 53 into juxtaposition with the wall panels 54 and disposed inwardly thereof. The opposed end wall panels 54 and the corresponding flap panels are then swung outwardly and folded back upon themselves at the score lines 57 and 58, which tends to draw the sidewall panels and corresponding flap panels inwardly into substantially horizontal position in overlying relation to the bottom panel 51, substantially as shown in Fig. 14.

The opposite ends of the carton need only be swung upwardly when the carton is to be used and the flap panels 55 may be swung into horizontal position for retaining the material deposited within the carton.

Figure 15:
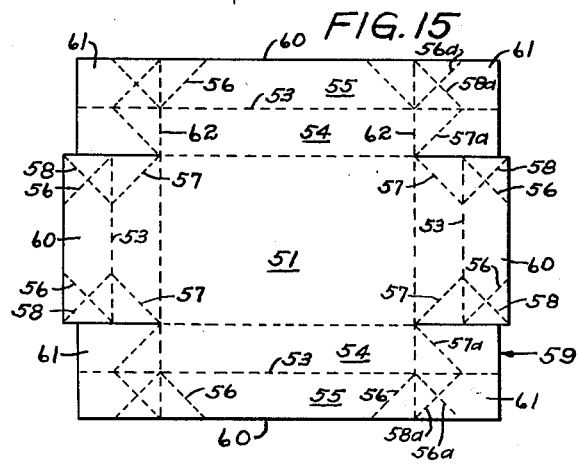
Fig. 15 is a plan view of a blank for forming the container shown in Fig. 12.

The blank for forming the carton 50 is shown in Fig. 15 and is indicated in general by numeral 59. The blank 59 defines a bottom panel 51 and a plurality of side and end panels 60 which have the score lines 53, 56, 57 and 58 impressed therein. The side and end panels 60 will be swung upwardly in the formation of the multi-sided carton. The side panels are provided with securing tabs 61 at the opposite ends thereof which have score lines 56a, 57a and 58a impressed therein for overlying the corresponding score lines 56—58 in the end panels when the securing tabs 61 are swung about the corners defining score lines 62.

The form of the invention shown in Fig. 2a is substantially identical to that shown in Figs. 1–7. The carton which is indicated in general by numeral 70 has an integral bottom 71 and multi-sided wall structure 72 which has a circumferentially extending dispartable zone defined by a perforated line 73 which defines wall panel 74 therebelow and flap panel 75 thereabove. The flap panels 75 are interconnected at the corners of the wall structure and are dispartable from each other along the perforated lines 76. As in the other forms of the invention the flap panels 77 are provided with diagonal score lines converging and intersecting with the perforated lines 73 to facilitate inward folding of the flap panels into carton-closing position. In this form of the invention the flap panels 75 may be separated from each other at the corners of the wall structure and swung outwardly and downwardly to facilitate more circulation of heat around the products in the containers during the cooking or baking operation. In addition, the outwardly and downwardly folded flap panel 75 will substantially stiffen the wall panel 74 and maintain these wall panels in upright and planar relation during the baking process, and may also serve as handles. It will also be noted that the flap panels 75 may be completely torn off the wall panel 74 after the mixing operation to facilitate efficient heat circulation around the product within the container and to facilitate directing of radiant heat from multi-directions into the carton interior.

It will be seen that I have provided a new and improved multi-purpose container which is closable for storing of materials such as cake mixes and the like therein, and which is openable to provide an upwardly extending and circumferentially continuous extension on the carton wall panels to facilitate adding and mixing of other ingredients to the material supplied in the carton and to also facilitate cooking or baking of the ingredients without removing the same from the container.

It will, of course, be understood that various changes may be made in the form, detail, arrangement and proportion of the parts without departing from the scope of my invention which consists of the matter described herein and set forth in the appended claims.

What I claim is:

1. An openable container comprising an integral bottom and multi-sided wall structure constructed of stiff, but bendable sheet material and defining a material-storing area and a multiplicity of corners, said wall structure including a multiplicity of interconnected and upright wall panels and a plurality of inwardly extending flap panels connected to the wall panels along a circumferentially extending fold line and being adapted to be swung upwardly substantially into the plane of the wall panels, a pair of said flap panels being interconnected with each other at a first corner of the wall structure and being bent outwardly back upon themselves at said corner at least one of said pair of flap panels being bent inwardly back upon itself along a diagonal line intersecting the fold line at said first corner, and said diagonal line also intersecting the top edge of the panel, whereby the flap panels, after having been swung upwardly, will retain themselves in upright position to provide access to the material-storing area.

2. An openable multi-purpose container for use in food product storage and preparation for consumption and the like, said container being constructed of a stiff, but bendable sheet material resistant to moisture penetration and heat within the range of food product cooking temperatures, and including an integral bottom and multi-sided rectangular wall structure defining an enclosed ingredient-strong area and a multiplicity of corners, said wall structure including a plurality of interconnected and upright wall panels secured to the bottom and also including a plurality of inwardly extending flap panels on at least three sides of the wall structure and each of said flap panels on said three sides being connected with the adjacent flap panel at the corner therebetween, and said flap panels being connected to the wall panels along a circumferentially extending fold line and being adapted to be swung upwardly substantially into the plane of the wall panels, the flap panels being folded outwardly with respect to each other at said corners, and one of the flap panels at each of said corners being folded inwardly along a diagonal fold line converging and intersecting with the circumferential fold line at the corresponding corner, whereby the flap panels, after having been swung upwardly, will retain themselves in upright position to permit access to the stored ingredients for producing batter and the like, and subsequent cooking of the ingredients.

3. An enclosure constructed of stiff, but bendable sheet material and having an integral multi-sided wall structure defining an enclosed area and including a plurality of interconnected and upright wall panels secured to the bottom and a plurality of inwardly extending flap panels folded inwardly and connected to the wall panels at a circumferential fold line, said flap panels being adapted to be swung to an upright position substantially in the planes of said wall panels, each of said flap panels being connected at the wall structure corners to the adjacent flap panels, and said flap panels being folded outwardly with respect to each other at said corners, and one of said flap panels adjacent each corner being folded inwardly along a diagonal fold line converging with and intersecting the circumferential fold line at the corner, and said diagonal line also intersecting the top edge of the flap panel, whereby the flap panels will remain in upright position when swung thereinto.

4. An openable container comprising an integral bottom and multi-sided wall structure constructed of stiff but bendable sheet material and defining a material-storing area and a multiplicity of corners, said wall structure including a multiplicity of upright wall panels secured to the bottom and interconnected with each other at said corners and a plurality of inwardly extending flap panels connected to the wall panels along a circumferentially extending fold line and being adapted to be swung upwardly substantially into the plane of the wall panels, each of said flap panels having an end connected at a corner to the end of an adjacent flap panel and each being folded outwardly at its end back upon the adjacent flap panel, and each of said flap panels at a position adjacent said end being folded inwardly along a diagonal fold line converging and intersecting with the circumferential fold line at the corner, whereby the flap panels, after having been swung upwardly, will retain themselves in upright position to provide access to the material in the container.

5. An openable multi-purpose container for use in food product storage and the preparation for food consumption and the like, said container comprising an integral bottom and multi-sided wall structure having said multiplicity of corners and being constructed of stiff but bendable sheet material resistant to moisture penetration and heat for cooking such food products therein, said wall structure including a multiplicity of upright wall panels interconnected with each other at said corners and secured to the bottom and also including a plurality of inwardly extending flap panels connected to the wall panels along a circumferentially extending fold line and being adapted to be swung upwardly substantially into the plane of the wall panels, the ends each of said flap panels being connected at corners to the ends of adjacent flap panels, and each of said flap panels being folded outwardly at its end back upon the adjacent flap panel, and each of said flap panels adjacent each end being folded inwardly along diagonal fold lines converging and intersecting with the circumferential fold line at the corners between adjacent flap panels, whereby the flap panels, after having been swung upwardly, will retain themselves in upright position to provide access to the material in the container.

6. An openable container comprising an integral bottom and multi-sided wall structure defining a multiplicity of corners and being constructed of stiff but bendable sheet material, said wall structure including a multiplicity of interconnected and upright wall panels and at least three inwardly extending flap panels on adjacent sides of the wall structure and each of said flap panels on said three sides being connected with the adjacent flap panel at the corner therebetween, and said flap panels being connected to the wall panels along a circumferentially extending fold line and being adapted to be swung upwardly into the plane of the wall panels, said three flap panels extending inwardly into close proximity with each other to substantially completely close the top of the material-storing area, said flap panels being bent outwardly with respect to each other at said corners, and one of the flap panels at each of said corners being bent inwardly back upon itself along a diagonal fold line converging and intersecting with the circumferential fold line at the corresponding corner whereby the flap panels, after having been swung upwardly, will retain themselves in upright position.

7. The invention as set forth in claim 6 wherein said three flap panels in close mutual proximity engage each other for tightly closing the material-storing area.

8. An openable container comprising an integral bottom and a multi-sided wall structure having a multiplicity of corners and constructed of stiff but bendable sheet material to define a material-storing area, said wall structure including a multiplicity of interconnected and upright wall panels and a plurality of interconnected and inwardly extending flap panels connected to the wall panels along a circumferentially extending fold line and being adapted to be swung upwardly substantially into the plane of the wall panels, said flap panels having dispartable zones therebetween at said corners to facilitate severance of the flap panels from each other to permit outward and downward folding thereof, the flap panels beig bent outwardly back upon themselves at said corner dispartable zones, and one of said flap panels adjacent each corner being bent inwardly back upon itself along a diagonal fold line converging and intersecting with the circumferential fold line at the corner, and said diagonal line also intersecting the top edge of the flap panel.

9. An openable multi-purpose container comprising an integral bottom and multi-sided wall structure having a multiplicity of corners and constructed of stiff but bendable sheet material to define a material-storing area, said wall structure including a multiplicity of interconnected and upright wall panels and a plurality of interconnected and inwardly extending flap panels connected to the wall panels along a circumferentially extending fold line and being adapted to be swung upwardly substantially into the plane of the wall panels, a pair of said flap panels being interconnected with each other at a first corner of the wall structure and being bent outwardly back upon themselves at said first corner, at least one of said pair of flap panels being inwardly bent back upon itself along a diagonal line in converging and intersecting relation with the circumferential fold line at said first corner and said wall structure having a dispartable zone extending along the circumferential fold line, and facilitating removal of the flap panels, whereby the flap panels may be successively swung into upright position and subsequently removed.

10. An openable container comprising an integral bottom and multi-sided wall structure having a multiplicity of corners and being constructed of stiff but bendable sheet material to define a material-storing area, the opposite sides of said wall structure being upwardly divergent whereby to incline the corners upwardly and outwardly, a circumferentially extending score line in the sidewall structure and defining wall panels therebelow and flap panels thereabove in the several sides of the wall structure, and diagonal score lines in the flap panels in converging and intersecting relation with the circumferential score line and in intersecting relation with the upper edge of the flap panels, whereby to facilitate nesting of the containers into small compass for storage and inwardly folding of the flap panels for substantially closing the material-storing area.

11. A blank for forming a closable multi-purpose container nestable with other similar containers and comprising a planar sheet of stiff but bendable material defining a multi-sided bottom panel and also defining a multiplicity of side panels extending outwardly from the sides of the bottom panel and in the plane thereof and being foldable upwardly therefrom to define a wall structure, each of said side panels having a longitudinal score line extending therethrough and spaced from said bottom panel for defining a circumferential fold line in the container when formed and said score lines defining in the side panels lower wall panels and upper flap panels, a pair of said side panels on opposite sides of the bottom panel each having securing tabs on the ends thereof and in the plane thereof to be affixed in overlying relation to the adjacent side panels in forming the wall structure, said securing tabs each having a score line extending in end to end relation with and generally longitudinally, but obliquely, of the score line of the corresponding side panel to form a continuation of the circumferential fold line when the container is formed with said pair of opposed side panels in upwardly divergent relation in the wall structure, the score lines in said securing tabs also defining wall panels and flap panels, and diagonal fold lines in each of the flap panels and in each of the tabs and extending in convergence and intersection with the ends of the score lines at the opposite ends of the side panels and also extending in intersecting relation with the edges of said side panels.

12. The invention set forth in claim 11, wherein said bottom panel is substantially rectangular, and wherein each of the securing tab diagonal fold lines and score lines define an angle complementary to the angle defined by the adjacent diagonal fold line and score line of the corresponding side panels.

References Cited in the file of this patent

UNITED STATES PATENTS

| | | |
|---|---|---|
| 888,653 | Potter | May 26, 1908 |
| 1,401,794 | Koff | Dec. 27, 1921 |
| 1,563,907 | Koff | Dec. 1, 1925 |
| 2,151,472 | Hubbard | Mar. 21, 1939 |
| 2,283,950 | Ringler | May 26, 1942 |
| 2,445,467 | Berke | July 20, 1948 |
| 2,525,268 | Napier | Oct. 10, 1950 |
| 2,828,061 | Zerlin | Mar. 25, 1958 |
| 2,836,340 | Crowley | May 27, 1958 |
| 2,868,429 | Shanahan | Jan. 13, 1959 |

UNITED STATES PATENT OFFICE

CERTIFICATE OF CORRECTION

Patent No. 2,917,221                                                December 15, 1959

Harold L. Risdon

It is hereby certified that error appears in the printed specification of the above numbered patent requiring correction and that the said Letters Patent should read as corrected below.

Column 6, line 28, for "closed ingredient-strong" read -- closed ingredient-storing --; column 7, line 73, for "panels beig" read -- panels being --.

Signed and sealed this 7th day of June 1960.

(SEAL)
Attest:

KARL H. AXLINE
Attesting Officer

ROBERT C. WATSON
Commissioner of Patents